(12) United States Patent
Kare et al.

(10) Patent No.: US 7,038,191 B2
(45) Date of Patent: May 2, 2006

(54) REMOTE SENSING APPARATUS AND METHOD

(75) Inventors: Jordin T. Kare, San Ramon, CA (US); Robert W. Turner, Seattle, WA (US)

(73) Assignee: The Boeing Company, Chicago, IL (US)

( * ) Notice: Subject to any disclaimer, the term of this patent is extended or adjusted under 35 U.S.C. 154(b) by 187 days.

(21) Appl. No.: 10/388,029

(22) Filed: Mar. 13, 2003

(65) Prior Publication Data

US 2004/0178329 A1   Sep. 16, 2004

(51) Int. Cl.
*G01J 1/42*      (2006.01)
*G02B 6/00*      (2006.01)

(52) U.S. Cl. .................................. 250/227.11; 385/12
(58) Field of Classification Search ........... 250/227.11, 250/227.2, 227.24, 227.28, 227.29, 231.1, 250/226; 385/12, 13, 116, 119, 120; 356/73.1, 356/222
See application file for complete search history.

(56) References Cited

U.S. PATENT DOCUMENTS

| 4,678,332 | A | * | 7/1987 | Rock et al. .................. 356/328 |
| 4,791,490 | A | * | 12/1988 | Knight et al. ............. 348/215.1 |
| 5,608,833 | A | * | 3/1997 | Au et al. ..................... 385/116 |
| 6,320,184 | B1 | * | 11/2001 | Winklhofer et al. ... 250/227.11 |

FOREIGN PATENT DOCUMENTS

JP           58100106 A   *   6/1983

* cited by examiner

*Primary Examiner*—Kevin Pyo
(74) *Attorney, Agent, or Firm*—Alston & Bird LLP

(57) ABSTRACT

The remote sensing apparatus and method include optical fibers and detectors. One end of the optical fibers is located in a focal plane of an optical system, with the end of each optical fiber collecting spectral energy arriving at a particular location in the focal plane. Each detector is coupled to the other end of a single optical fiber, and the detector measures the intensity of the spectral energy emitted by the optical fiber. Sets of detectors may also be utilized, such that each set of detectors is optically coupled to a respective fiber, and at least one separation element separates the spectral energy emitted by each optical fiber into a plurality of spectral bands. Each detector in each set of detectors then receives a respective spectral band emitted by a respective optical fiber.

48 Claims, 4 Drawing Sheets

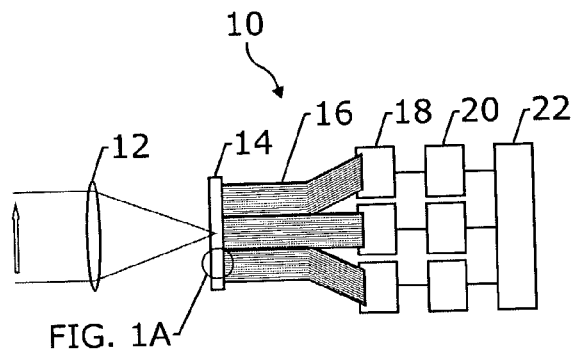
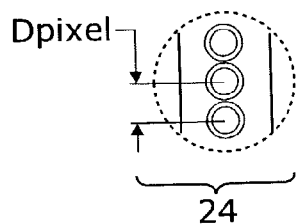
FIG. 1   FIG. 1A
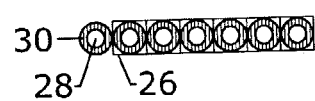
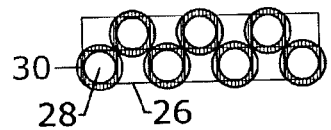
FIG. 2A   FIG. 2B
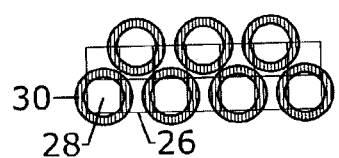
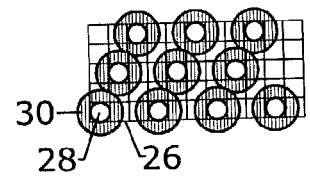
FIG. 2C   FIG. 2D
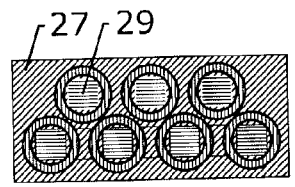
FIG. 2E

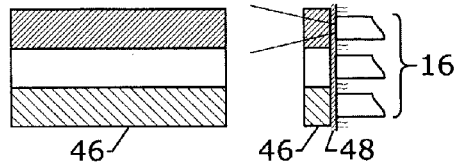
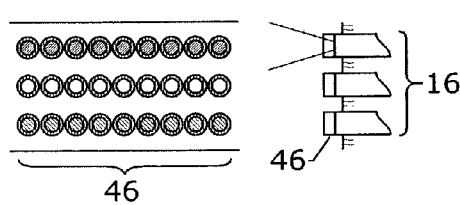
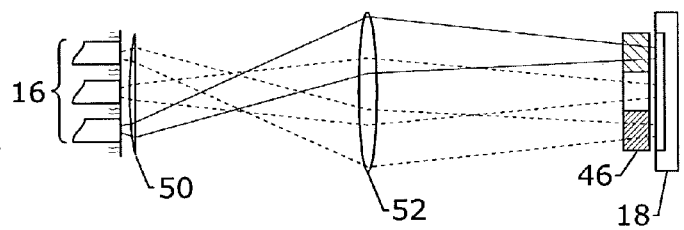
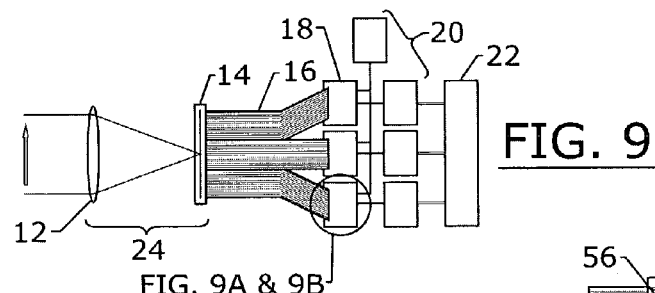
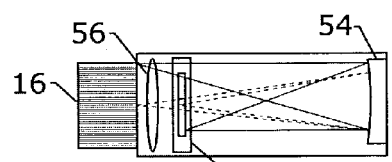
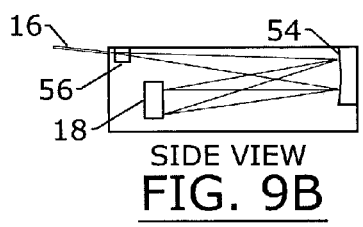

REMOTE SENSING APPARATUS AND METHOD

BACKGROUND OF THE INVENTION

The present invention relates to a remote sensing apparatus and method having a focal plane occupied by one end of a group of optical fibers, and a plurality of detectors coupled to the other end of the optical fibers such that each detector is advantageously coupled to a single optical fiber in order to accurately measure the intensity of light from a single location in the focal plane.

Remote sensing devices detect and measure energy reflected and/or emanating from remote objects in order to determine physical properties of the objects and, in some instances, to identify the materials from which the remote objects are formed. For example, remote sensing devices operating in the visible and infrared regions of the electromagnetic spectrum are used extensively to measure the characteristics of the Earth's land surface, ocean surface, and atmosphere as a function of position, as well as the characteristics of other bodies in the Solar System. These remote sensing devices use an optical system comprised of one or more optical elements, such as mirrors or lenses, to collect and focus electromagnetic energy from the remote object, such that an image of at least a portion of the remote object is formed in a focal plane of the optical system. This focal plane may in fact be a flat plane, or it may be a curved surface, such as a segment of a spherical or toroidal surface.

A physical assembly located in the focal plane, hereinafter referred to as the focal plane assembly, contains a means of measuring the electromagnetic energy at many points in the focal plane. The area in the focal plane over which these points are distributed is referred to as the extent of the focal plane, and the corresponding area of the remote object that is measured at any one time is referred to as the field of view of the remote sensing device.

The electromagnetic energy measured at each point is integrated over one or more ranges of wavelength. For example, in a panchromatic sensor, energy is measured over a single broad range of wavelengths, as in a black-and-white television camera. In a multispectral sensor, energy is detected in a small number of discrete wavelength bands, typically 4 to 10, with the center wavelength and width of each band selected to detect one or more specific characteristics of the target. A typical multispectral sensor is the NASA Advanced Land Imager, which has 9 bands in the visible, near infrared, and short-wave infrared spectral ranges. In a hyperspectral sensor, energy is detected in a large number of narrow bands, typically 32 to 256. In most hyperspectral sensors, bands are of uniform width and uniformly distributed over a range of wavelengths. A typical hyperspectral sensor is the NASA AVIRIS airborne sensor, which has 224 bands, each 10 nanometers wide, between 0.4 to 2.5 microns.

Certain remote sensing devices, especially those located in satellites, spacecraft, aircraft and other vehicles, employ a type of sensor which is referred to as a "pushbroom" sensor. In this type of sensor the field of view is much wider in one direction, referred to as the cross-track direction, than in the perpendicular direction, referred to as the in-track direction. The field of view is scanned over the remote object(s) by the in-track forward motion of the vehicle.

Another type of sensor is a "line scan" sensor in which the remote sensing device is stationary, but the field of view is moved in the in-track direction by rotating the device or a component of it, such as a mirror. Alternatively, the device and field of view may be fixed and objects may move through the field of view.

In existing realizations of these types of sensors, the energy in the focal plane is measured by an array of photosensitive detectors, such as charge-coupled device (CCD) elements or photodiodes, located at the focal plane and arranged in one or more rows. Each detector generates electrical signals at regular intervals, and each signal is proportional to the energy it has received in the latest interval. By receiving the signals from one or more rows of detectors over a period of time as the field of view is scanned, a processing element can assemble a two-dimensional image of at least a portion of the remote object(s). Such an image is comprised of picture elements, i.e., pixels, where each pixel corresponds to a single measurement from an individual detector.

For some multispectral and hyperspectral remote sensors, there may be 20,000 or more detectors in each row of detectors. A group of detectors, such as one or more rows of approximately 2000 detectors, may be located on a single physical substrate, i.e., a chip, and the chips may be aligned in rows in the focal plane. Each row of detectors may be configured such that it detects only a particular spectral band, i.e., range of wavelengths, of the radiated and/or reflected energy that is received by the detectors. As such, each row of detectors may be located behind a filter of some type that filters out all of the energy except the desired spectral band. For a multispectral sensor, multiple rows of detectors are required. In typical applications, individual detectors have linear dimensions in the range of 5 to 50 micrometers, but additional space must be allowed between rows of detectors for a variety of technical reasons, including but not limited to provisions for electronic circuitry associated with each detector, limits on the minimum width with which spectral band filters can be constructed, and the need to use different substrate materials for different spectral bands. As such, the detectors for each spectral band take up to 1 millimeter of space in the focal plane in the in-track direction. In addition, some sensors require two sets of detector chips, offset in the in-track direction, so that chips can overlap in the cross-track direction to prevent gaps in the image. In one typical multispectral sensor, each chip takes up 10 millimeters of space in the focal plane in the in-track direction (i.e., each chip has an in-track extent of 10 millimeters), and the entire array of detector chips, takes up 20 millimeters of space in the focal plane as a result of their arrangement in two rows.

The in-track extent of the detector array causes the field of view for some detectors to be considerably offset in the in-track direction from the field of view of other detectors. The optical system of the multispectral sensor referred to above has a focal length of approximately 1 meter, so that a 20 millimeter focal plane extent produces approximately 20 milliradians difference in in-track angle of view, i.e., between the direction from which the first detector on the first chip receives energy and the direction from which the last detector on the last chip receives energy at a given time.

The in-track variation in angle of view results in a distance between positions in the scene or target observed by different rows of detectors, and the distance varies depending on the distance from the sensor to the scene or target. The distance from the sensor to the scene may vary in an unknown fashion due to changes in the sensor position (e.g., satellite orbit variations or aircraft altitude changes) or due to variations in surface elevation in the scene. The processing element is required to correct for the difference in scene position observed by different rows of detectors, and this correction becomes more difficult and less accurate as the in-track extent of the detector array increases. For example, for the sensor described above, a 100 meter error in determining the elevation of the scene results in up to a 2-meter error in determining the relative position of pixels from different rows of detectors.

The in-track extent of the detector array also results in a time interval between when the first row of detectors observes a given point on the ground and when the last row of detectors observes the same point. For the sensor described in the above example, which is carried by a satellite at an altitude of approximately 700 kilometers, the maximum delay is approximately 2 seconds. During this time, the satellite or aircraft carrying the sensor can change orientation, i.e., pitch, yaw, or roll, resulting in errors in determining the relative position of pixels from different rows of detectors.

The in-track extent of the detector array also results in a variation in the angle from which a given point in the scene or target is viewed by different spectral bands, which can affect the relative amount of radiation received by the sensor in the different bands.

Furthermore, the in-track extent of the detector array also requires that the optical system provide a high-quality image over this in-track extent, which may be difficult to do while maintaining acceptable optical system performance in other respects, such as aberrations and optical distortions.

To improve the accuracy and reduce the complexity of the corrections that the processing element must perform, it would be desirable to reduce the amount of space utilized by the detectors in the focal plane. As such, various components, such as dichroic (i.e., wavelength-selective) mirrors, may be used to dissect the radiated and/or reflected energy, which is typically visible and/or near and short-wave infrared radiation, into its spectral bands. The spectrally separated radiation then must be directed to the appropriate detectors, such as with lenses or by precise detector positioning. It is difficult, however, to maintain the alignment of mirrors to the detectors because temperature changes may cause the mirrors to slightly change position. In addition, the mirrors require a relatively significant amount of space in front of the focal plane, such that mirrors typically may only be used to separate 2 or 3 spectral bands.

In other embodiments, a wavelength dispersive element, such as a prism, may be used to disperse the energy received via the optical system that is delivered to the detectors, such that the rows of detectors, although physically separated, are optically co-aligned and view the same in-track location in the scene or target. These embodiments, however, are difficult to utilize, particularly when the desired spectral bands are close together or overlap, because the rows of detectors also overlap. Additionally, because wavelength and physical position in the focal plane are directly related in these embodiments, certain design options are precluded. For example, it is not possible to provide two or more rows of detectors that are sensitive to the same spectral band, which is commonly done to improve sensitivity or provide redundancy in case of detector failure. In addition, it is difficult to utilize a dispersive element when the detector array is too wide in the cross-track direction to use a single detector chip, because it is difficult or impossible to align multiple dispersive elements and multiple chips with sufficient accuracy to maintain a uniform spectral response.

Another way to attempt to mitigate the effects of the multiple rows of detectors that create a relatively large focal plane, and require complex corrections, as described above, is to utilize an image conduit. For instance, an image conduit may be made of a group of optical fibers that are fused together and transmit an image from one location to another. As such, the group of fibers may receive the energy at the focal plane, then transmit that energy to a group of detectors. When an image conduit is used, the size of the focal plane may be somewhat reduced, for example by eliminating the additional in-track spacing needed to overlap detector chips in the cross-track direction, or by providing some optical magnification in the in-track direction from the focal plane to the detectors. As such, the corrections that must be made to the readings are decreased, but not eliminated.

The drawback to this configuration, however, is that random subgroups of the optical fibers illuminate each detector, which makes it impossible to control how much light is transmitted to each detector. For large detectors (e.g., 1 mm or larger), the number of image conduit fibers coupled to a detector is large (>10) and detector-to-detector variations can be determined and compensated for. For large arrays of small detectors, however, the number of image conduit fibers coupled to a detector is small, and many fibers couple to two or more detectors. Therefore, the effective sensitivity of each detector is different, and uniform images are difficult to create. In addition, the spatial response of each detector (i.e., the response to a point source of radiation in the scene as a function of the point source position) is complex, and differs from detector to detector. As such, the electrical signals provided by the detectors and read by the processing element, which are proportional to the energy received by the respective detector, may not be consistent, i.e., one detector may be more sensitive to a particular scene or target configuration than another. Therefore, because there is no way to know whether the electrical signals that are read by the processing element are consistent, an incorrect or misleading image of the scene or target may be created.

In other applications (i.e., astronomical spectroscopy), a single fiber has been utilized to transmit energy received at one end to a single detector connected to the other end. Although it is possible to know how much light is transmitted to the detector in the configuration in which one fiber transmits energy to one detector, the drawback is that each assembly of detector and fiber is physically separate, and only a small number of detector/fiber pairs (i.e., 100 or less) may be practically utilized in a sensor, which prevents this configuration from being used in pushbroom imaging applications. As such, there is a need in the industry for a remote sensing apparatus in which a plurality of fibers may transmit energy from a focal plane to a plurality of detectors in such a way that the amount of energy received by each detector is known or may be determined, and therefore, an accurate image of the desired area may be created.

BRIEF SUMMARY OF THE INVENTION

The remote sensing apparatus and method of the present invention provide efficient techniques for accurately measuring the intensity of spectral energy from a remote object, such as in multispectral and hyperspectral applications. The accuracy of the measurements is due to the design of the remote sensing apparatus, which has multiple optical fibers that direct the spectral energy to detectors. Specifically, the focal plane of an optical system is occupied by one end of a group of optical fibers, and a plurality of detectors are coupled to the other end of the optical fibers, such that each detector is advantageously coupled to a single optical fiber. Because the in-track focal plane extent of the remote sensing apparatus is much smaller than that of conventional sensors, and because each detector is coupled to a single optical fiber, such that the amount of energy received by each detector is known or may be easily determined, the apparatus and method provide the necessary information for creating an accurate image of the remote object, without the need for complicated corrections.

The remote sensing apparatus of the present invention includes a plurality of optical fibers, such as layers of optical fibers and/or optical fiber ribbon(s), and a plurality of detectors. One end of the optical fibers is located in a focal plane of an optical system, such that the end of each optical fiber collects spectral energy arriving at a particular location in the focal plane. In some embodiments, the particular locations in the focal plane may be picture elements, such that the end of each optical fiber collects spectral energy arriving at a respective picture element. The diameter of each optical fiber may be smaller than, equal to or larger than the respective picture element. Each detector is coupled to the other end of a single optical fiber, and the detector measures the intensity of the spectral energy emitted by the optical fiber. Each of the fibers may be directly attached to one of the detectors, or the spectral energy emitted by the fiber may be directed to the appropriate detector with a mirror or a lens.

The remote sensing apparatus may also include one or more filter(s), such as multilayer interference filters, aligned with one or more of the optical fibers to filter out at least a portion of the spectral energy received and/or emitted by the optical fiber(s). The filter may be located near the focal plane containing one end of the optical fibers, or it may be located near the detectors. In addition, the filter may be deposited on the desired end of an optical fiber.

Other embodiments of the remote sensing apparatus of the present invention may include sets of detectors, such that each set of detectors is optically coupled to a respective fiber. In addition, at least one separation element, such as a dispersive or dichroic element, separates the spectral energy emitted by each optical fiber into a plurality of spectral bands, and each detector in each set of detectors receives a respective spectral band emitted by a respective optical fiber. A dispersive element may be a prism or a grating.

An alignment element, such as an alignment element that defines grooves for carrying the optical fibers, may align the optical fibers with the detectors or sets of detectors, to couple a single optical fiber to each detector or set of detectors. In other embodiments, the alignment element may be a faceplate fixed to the detectors, and defining openings that are aligned with the detectors.

Embodiments of the remote sensing apparatus may also include a focal plane assembly for securing the ends of the optical fibers in a uniform distribution. Furthermore, the focal plane assembly may be planar or curved. The ends of the optical fibers may be secured in the focal plane assembly at a predetermined angle relative to the focal plane. Further embodiments may also include a processing element in communication with the detectors to receive spectral energy intensity measurements from the detectors. The processing element may also display a representation of the measurements as at least one image.

Other aspects of the present invention include a method for detecting spectral energy in which spectral energy is received from a remote location with the first ends of a plurality of optical fibers disposed in a focal plane. The spectral energy is transmitted by the optical fibers to a plurality of detectors, which are located near opposed second ends of the optical fibers. A single detector is dedicated to each optical fiber, and the spectral energy emitted by a respective optical fiber is detected by a respective detector.

Prior to transmitting the spectral energy, the plurality of optical fibers may be aligned with the plurality of detectors to couple one optical fiber to each detector. In other embodiments, the second end of at least one optical fiber may be aligned with a mirror or a lens that reflects the spectral energy emitted by the optical fiber, and directs the spectral energy to a dedicated detector. In addition, a predefined bandwidth of spectral energy transmitted by the optical fiber may be filtered prior to the detector detecting the spectral energy emitted by the fiber. Once the spectral energy is detected, then the intensity of the spectral energy may be determined, and a representation of the intensity measurement may be displayed as at least one image.

An association between a location on the focal plane and a respective detector may be determined by successively illuminating each location on the focal plane and measuring the respective detector response. Furthermore, a faulty detector and/or faulty optical fiber may be identified when the respective detector does not respond after illuminating a location on the focal plane. Once identified, the faulty detector and/or faulty optical fiber may be replaced with a spare detector and/or optical fiber, respectively.

Thus, the remote sensing apparatus and method for detecting spectral energy provide efficient and effective techniques for measuring the intensity of spectral energy that is received from a remote location. The measurements require less complicated correction calculations than the spectral energy intensity measurements made by conventional remote sensors because the focal plane of the present remote sensing apparatus is more compact, and the amount of spectral energy incident upon each detector is known or may be easily determined. In addition, the compact focal plane and the flexibility in position and orientation of the energy-receiving elements provided by the remote sensing apparatus and method increases the flexibility in designing optical sensors with large numbers of detectors that enable multiple spectral bands and large fields of view to be detected.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 illustrates a remote sensing apparatus according to one embodiment of the present invention;

FIGS. 2A–2E illustrate various embodiments of the alignment of single optical fibers with picture elements of the focal plane;

Figure 3:
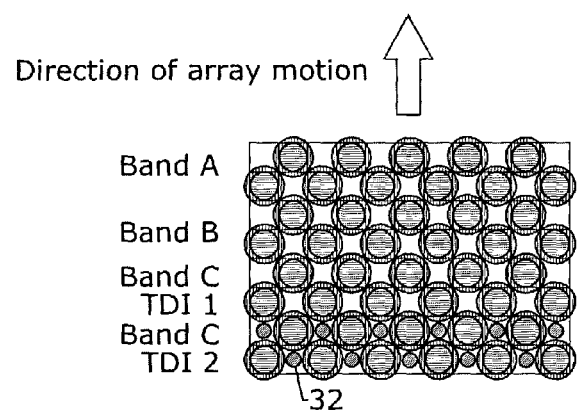
FIG. 3 illustrates alignment of optical fibers such that a double row of staggered optical fibers is associated with a particular spectral band and/or may be utilized for Time-Delay Integration, according to one embodiment of the present invention.

FIGS. 8A–8C illustrate various embodiments of filters applied to the optical fibers and/or the detectors; and FIGS. 9, 9A and 9B illustrate a remote sensing apparatus in which the detectors include dispersive elements that separate the spectral bands of the spectral energy from the fibers and direct the spectral bands to the appropriate detectors, according to one embodiment of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The remote sensing apparatus and method for detecting spectral energy provide efficient and effective techniques for measuring the intensity of spectral energy that is received from a remote location. The measurements are more accurate and require less complicated correction calculations than the spectral energy intensity measurements made by conventional remote sensors because the in-track focal plane extent of the present remote sensing apparatus is more compact, while continuing to provide a sufficiently wide field of view, and the amount of spectral energy incident upon each detector is known or may be easily determined. In addition, the compact focal plane area and the flexible positioning and orientation of pixels in the focal plane provided by the remote sensing apparatus and method increases the flexibility in designing optical sensors with large numbers of detectors, which enables multiple spectral bands and large fields of view to be detected.

Remote sensing devices typically detect and measure energy, such as spectral energy, reflected and/or emanating from remote objects in order to identify and categorize the objects by class, type, and/or spatial distribution, and, in some instances, to identify the materials from which the remote object is formed. Certain remote sensing devices, such as those located in satellites, spacecraft, aircraft and other vehicles, include a focal plane assembly for receiving electromagnetic energy that reflects and/or radiates from a remote location, such as the Earth's land surface, oceans, atmosphere, and/or other bodies in a solar system. The electromagnetic energy that is received is principally in the visible or infrared regions of the electromagnetic energy spectrum.

The remote sensing apparatus described herein may employ any type of sensor known to those skilled in the art, such as a pushbroom type sensor or a line scan sensor. Although the pushbroom type sensor is used in examples described herein, line scan sensors or any other type of sensor may similarly be used in the illustrative examples.

One embodiment of the remote sensing apparatus 10 of the present invention is illustrated in FIG. 1. This embodiment includes an optical system 12, a focal plane assembly 14, optical fibers 16, detector arrays 18, detector electronics 20, and a processing element 22. The optical system 12, schematically depicted as a lens in FIG. 1, receives spectral energy reflected and/or emitted by a remote object located in the field of view of the optical system. The optical system 12 then focuses the spectral energy onto the focal plane and, therefore, the focal plane assembly 14. As described above, the focal plane assembly is the hardware that is physically located at the focal plane. Examples of optical systems may include but are not limited to refractive lens assemblies such as a Nikon camera lens, on-axis reflective or catadioptric telescopes such as various Cassegrain telescopes, or mission-specific custom optical systems such as an all-reflective three-mirror off-axis anastigmatic telescope.

Although FIG. 1 illustrates the optical fibers 16 in uniform rows, which is appropriate for sensors in which the field of view is linear, and the entire sensor moves perpendicular to the field of view to provide two-dimensional imaging, such as a pushbroom sensor, other distributions of optical fibers may be utilized. For example, the optical fibers 16 may be distributed with non-uniform spacing to provide varying resolution, or the optical fibers 16 may be distributed along a curved focal plane assembly 14 designed to occupy the curved focal plane produced by certain types of optical systems 12. Various techniques may be utilized to create focal plane assemblies 14 that are sufficiently wide to scan the desired field of view. In one embodiment, the focal plane assembly 14 may be assembled with optical fibers that are wound on a cylinder and maintained in place, such as by applying an adhesive or epoxy to the optical fibers. If desired, spacers may be used between the optical fiber windings. The optical fibers then may be cut in the direction of the longitudinal axis of the cylinder to form a ribbon of optical fibers. The optical fiber ribbon could also be formed with multiple layers of optical fibers, such as by applying a layer of adhesive or epoxy between the layers. In another embodiment, optical fibers may be positioned on a grooved alignment component, then transferred to an adhesive-coated substrate. The grooved alignment component permits the spacing between the optical fibers to be different at the end located in the focal plane from that at the end facing the detectors. In a further embodiment, the optical fibers may be assembled on a grooved substrate, which is then mounted to a fixture that securely holds the fibers located in the focal plane. More than one substrate may be utilized, and the substrates may be aligned side-by-side along the focal plane, and/or the substrates may at least partially overlap. The above embodiments are provided only as examples, and any other technique for assembling the optical fibers to create collectively a focal plane assembly 14 as known to those skilled in the art may be employed.

The optical system focal plane may be considered to be divided into a square or nearly-square grid of picture elements (pixels). The spacing of the pixels ($D_{pixel}$) is chosen in combination with the optical system focal length and sensor-to-target distance to provide the desired Ground Sample Distance (GSD). GSD is defined as the desired spacing on the ground or other target surface between areas whose reflected or emitted energies are measured or sampled by adjacent detectors in the cross-track direction, i.e., perpendicular to the direction of motion of the sensor, and successive measurements of one detector in the in-track direction, i.e., the direction of motion of the remote sensing apparatus 10. Ideally, one detector receives all of the spectral energy in a desired band that falls on one square pixel area.

FIGS. 2A–2E illustrate various embodiments of the manner in which optical fibers 16 may be aligned with the pixels 26. As shown in FIGS. 2A–2D, each optical fiber includes a core 28 and a cladding 30. The cladding 30 surrounds the core 28, and the difference in the indexes of refraction of the core material relative to the cladding material causes the spectral energy to be reflected by the cladding 30, and therefore guided through the core 28 of the optical fiber, as known to those skilled in the art. As such, at least the core 28 of each optical fiber is aligned with a pixel 26.

FIG. 2A illustrates a single row of square pixels 26, with a single optical fiber aligned with each pixel. In the embodiment of the focal plane of FIG. 2A, both the optical fiber core and cladding are aligned with a pixel, such that the diameter of the core of the optical fiber is less than $D_{pixel}$. The entire pixel 26 is, therefore, receiving more spectral energy than the core of the optical fiber receives. As such, an optical fiber collects less than 75% of the spectral energy available from the pixel, depending upon the size of the cladding as compared to the size of the core of the optical fiber. In some embodiments, the size of the cladding as compared to the size of the core is great enough that the core of the optical fiber collects less than 50% of the spectral energy available from the pixel. The embodiment shown in FIG. 2A is also subject to aliasing, in which images containing features similar in size to Dpixel are measured differently depending on whether those features are aligned with the center of an optical fiber or fall between two fibers.

To permit the core 28 of the optical fiber to receive more of the spectral energy available from the pixel, and to reduce aliasing, the optical fibers may be staggered along two or more rows of pixels. FIG. 2B illustrates one embodiment of staggered optical fibers aligned with single pixels in a double row of square pixels. In this embodiment, the diameter of the core of the optical fiber is equal to $D_{pixel}$. Although the entire pixel 26 receives more spectral energy than the core of the optical fiber receives, the core of the optical fiber occupies a large portion of the pixel. As such, the core of an optical fiber arranged in the manner shown in the embodiment of FIG. 2B collects approximately π/4 or 78% of the spectral energy available from the pixel.

In the embodiment shown in FIG. 2C, the diameter of the core of the optical fiber is larger than $D_{pixel}$. Thus, the core of an optical fiber arranged in the manner shown in the embodiment of FIG. 2C collects approximately the same amount of spectral energy received by the square pixel. In this embodiment, the optical fibers are also typically staggered along multiple rows of pixels to permit the optical fibers to extend beyond the edges of a single pixel. FIG. 2D illustrates a further embodiment of multiple rows of pixels with the cores of single optical fibers having relatively thick cladding aligned with respective pixels. To arrange the fibers shown in FIG. 2D appropriately, spacers may be placed between the fibers. FIG. 2E illustrates an embodiment which minimizes aliasing, in which at least a portion of the cores of optical fibers arranged as in FIG. 2C are covered by an opaque mask 27 defining apertures 29 in the shape of the pixels, such that the spectral energy collected by each core is exactly the energy received by a square pixel. Any technique known to those skilled in the art may be utilized to make the opaque mask. For instance, the mask 27 may be made from a metal or other opaque film layer, with openings defined by photolithographic etching processes.

FIG. 3 illustrates another embodiment of a focal plane in which multiple layers of optical fibers are used to detect multiple spectral bands. The optical fibers are aligned such that each optical fiber collects spectral energy from a single pixel, and each row of optical fibers detects a spectral band. The optical fibers may be staggered double rows, as described with respect to FIG. 2B, and each set of double rows may be associated with a particular spectral band of energy, as illustrated by the topmost rows shown in FIG. 3.

The spectral energy may be separated into bands in any conventional fashion, such as by a series of wavelength-selective filters, prior to illumination of the optical fiber. In addition, spacers 32 may be positioned between the optical fibers to precisely align the core 28 of an optical fiber with a single pixel. The spacers 32 also may improve the rigidity of the array of optical fibers that is aligned with the array of pixels. The bottommost rows shown in FIG. 3 illustrate that multiple layers of optical fibers may also be used to detect the same spectral band in order to provide a form of Time-Delay Integration (TDI), which includes summing the spectral energy received by two or more rows, taking into account the appropriate delay.

Each row of optical fibers shown in FIGS. 2A–2E and in FIG. 3 may be a separate optical fiber ribbon, or two or more rows of the optical fibers may be located in one ribbon arrangement. Thus, if two or more rows of the optical fibers are arranged in one ribbon, then the individual optical fibers must be aligned appropriately at least at the end of the ribbon located in the focal plane 14. For instance, the optical fibers may be staggered with respect to each other as shown in FIGS. 2B–2D and 3. Other than the end of the optical fiber ribbon located in the focal plane, the optical fibers may be arranged within the ribbon in any desired manner. For instance, the multiple rows of optical fibers may be arranged in a single row at other points along the length of the ribbon.

Figure 4:
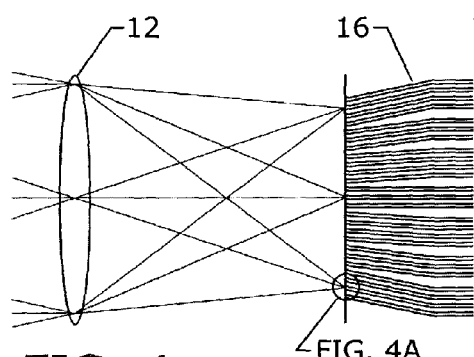
FIGS. 4 and 4A illustrate a row of optical fibers along the focal plane that are oriented such that the fiber ends are perpendicular to at least a portion of the incident beams according to one embodiment of the present invention.
Figure 4A:
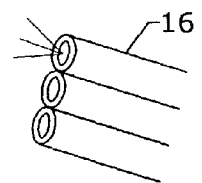

The ends of the optical fibers 16 may be oriented in any desired manner relative to the focal plane assembly 14. For instance, the ends of the optical fibers may be oriented at a predetermined angle relative to the focal plane. FIGS. 4 and 4A illustrate a row of optical fibers along the focal plane that are oriented such that the fiber ends are perpendicular to at least a portion of the incident beams according to one embodiment of the present invention. This allows the construction of sensors which maintain a uniform coupling of radiant energy into each fiber even though the direction from which the radiation arrives at the focal plane varies. This embodiment is also beneficial in combination with filters deposited directly on the fiber ends, as discussed below, since the filters can be kept in a fixed orientation relative to the direction of the received energy, independent of the direction of the energy is received relative to the focal plane. This is advantageous because the wavelengths transmitted by many filters depend on the angle at which the energy is received.

To connect the optical fibers 16 to detector arrays 18, the optical fibers 16 may be separated into sub-bundles, and each sub-bundle may be connected to a detector array 18. A detector array 18 is made of multiple individual detectors, and each detector is coupled to a single optical fiber. The detectors measure the intensity of the spectral energy that is emitted by the optical fiber. In some embodiments of the remote sensing apparatus and method, the detectors may be Charge Coupled Device (CCD) sensors or photodiode array detectors, such as the KLI series of linear CCD arrays manufactured by Kodak, or HiViSi hybrid silicon photodiode arrays manufactured by Rockwell Scientific. Other detectors may be utilized as known to those skilled in the art to be capable of detecting spectral energy.

In separating the optical fibers 16 into sub-bundles, and in aligning single optical fibers within the sub-bundles with individual detectors, it is not necessary that the optical fibers be maintained in the same positional relationship as at the focal plane assembly 14. Thus, optical fibers that are adjacent at the focal plane do not also have to be adjacent at the detector. In some embodiments, the processing element 22 may determine which detector corresponds to which focal plane position by recording which detector receives the light from which optical fiber when a light source is scanned across the focal plane.

Because the optical fibers do not have to maintain the same positional relationship, replacement of a defective optical fiber and/or detector is much easier than in conventional remote sensing apparatus in which the detectors are mounted in the focal plane assembly 14. Thus, instead of having to double the size of an already large focal plane detector array to add backup detectors, as was done previously, a set of backup fibers may be added to the focal plane assembly 14, which increases focal plane extent a small amount as compared to the size of a conventional focal plane. As many backup detectors as desired then may be added at the other end of the optical fibers without affecting the size of the focal plane assembly. As such, when an optical fiber breaks, and/or when a detector malfunctions, one of the extra optical fibers may be coupled to an appropriate extra detector, and the data detected from the extra detector is used instead of the data from the malfunctioning detector. For example, the processing element 22 may receive information regarding the malfunctioning detector and the replacement detector, then automatically replace the data from the malfunctioning detector with the data from the replacement detector. Because the focal plane advantageously remains compact, the replacement data provided by the apparatus and method of the present invention is therefore more accurate and requires fewer complicated corrections than that provided by replacement detectors of conventional remote sensing apparatus.

Figure 5A:
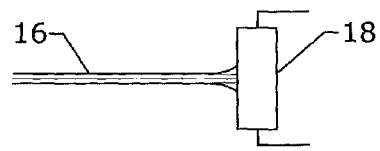
FIGS. 5A–5C illustrate various embodiments of the manners in which optical fibers may be coupled to detectors.
Figure 5B:
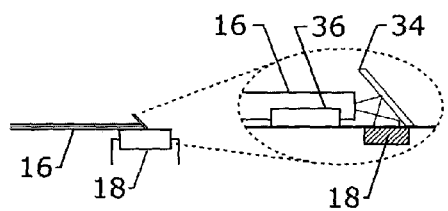
Figure 5C:
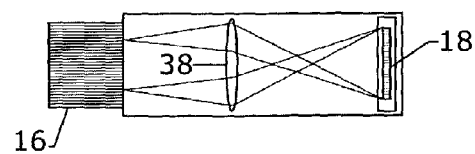

FIGS. 5A–5C illustrate embodiments of manners in which the optical fibers 16 may be coupled to the detector arrays 18. FIG. 5A shows a side view of an embodiment in which single optical fibers may be coupled to the individual detectors by simply polishing the ends of the optical fibers and attaching the ends of the optical fibers to the individual detectors, i.e., a "face-on" arrangement. When utilizing a "face-on" arrangement, it may be advantageous to apply index matching fluid between the optical fibers and the detector surface to minimize reflections.

FIG. 5B illustrates a side view of an embodiment in which the optical fibers are substantially parallel to the surface of the detectors, and the spectral energy from the optical fibers impinge a reflective surface 34, such as a microfabricated mirror. The reflective surface 34 is angled such that the spectral energy that impinges the reflective surface directed toward the appropriate detectors of the detector arrays 18. For example, if the optical fibers 16 are parallel to the surface of the detectors, the reflective surface may be positioned at the 45° angle to the surface in order to direct spectral energy from the optical fibers 16 to the detectors. In the embodiment shown in FIG. 5B, an alignment element 36 may be utilized to ensure the optical fibers 16 are appropriately aligned with the reflective surface 34. In one embodiment of the remote sensing apparatus of the present invention, the alignment element 36 may be a grooved silicon alignment structure, but in other embodiments, the alignment element 36 may be any other type of structure(s) capable of retaining the optical fibers in the desired arrangement.

In embodiments of the remote sensing apparatus of the present invention in which the optical fiber spacing is different from the detector spacing, relay (or reimaging) optics may be utilized to couple the spectral energy from the optical fibers onto the detectors. In FIG. 5C, the relay optic is a lens 38 that is shaped and positioned appropriately to direct the spectral energy from the optical fibers 16 to the appropriate detectors of the detector arrays 18. In other embodiments of the remote sensing apparatus, the relay optic may be a mirror, a multiple element optical system, or other type of system that is capable of directing the light from the optical fibers to the appropriate detectors.

Figure 6A:
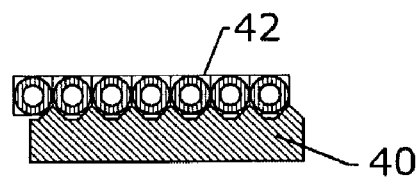
FIGS. 6A–6C illustrate various embodiments for aligning optical fibers with detectors.
Figure 6B:
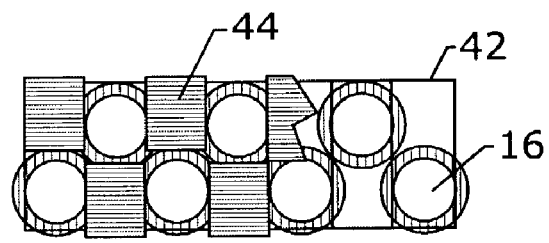
Figure 6C:
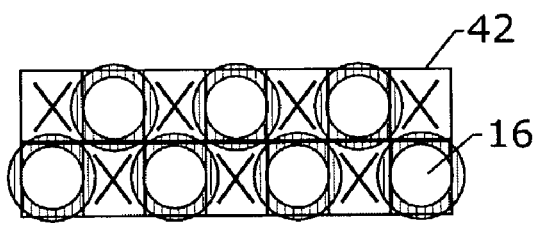

Regardless of whether the optical fibers are in direct contact with the detectors, or whether the spectral energy is directed from the optical fibers to the detectors via relay optics or the like, the optical fibers 16 should be held in precise alignment relative to the detectors. FIGS. 6A–6C illustrate a few embodiments of techniques for aligning the optical fibers 16 with the detectors of the detector arrays 18. In one embodiment of the remote sensing apparatus of the present invention, an alignment element may be utilized to hold the optical fibers in alignment with the detectors. For example, as shown in FIG. 6A, a grooved alignment structure 40 may be attached or otherwise positioned relative to the detector arrays, such that each detector pixel 42 is aligned with one groove in the alignment structure 40. One embodiment of a grooved alignment structure 40 is a microfabricated silicon structure, such as that available from Optical Micro Devices Ltd. The grooved alignment structure 40 may be made with as many grooves as needed to align each optical fiber with a single detector pixel. As such, each optical fiber may lie in a groove of the alignment structure 40 that is aligned with the appropriate detector pixel 42. The grooved alignment structure 46 may be fabricated as part of the detector arrays 18 or it may be attached or otherwise positioned relative to the detector arrays 18 after fabrication. Furthermore, the grooved alignment structure 40 may be located within an optical fiber ribbon, if desired. In other embodiments, the optical fibers may not be configured as a ribbon or the optical fibers may be broken out from the ribbon, such that the grooved alignment structure 40 supports the optical fibers separately.

Other embodiments of the alignment element may include a faceplate defining multiple openings, such that each opening may support a single optical fiber. The openings may also be aligned with the appropriate detector pixels to align the optical fibers supported by the faceplate with the appropriate detector pixels. The faceplate may be made of silicon, and the openings may be defined by photo-etching or laser drilling, but other types of sufficiently rigid materials may be utilized for the faceplate and any other methods known to those skilled in the art for defining the openings may also be utilized. Further embodiments of the alignment element may be any type of support structure that aligns the optical fibers with the appropriate detectors, while also securely maintaining the desired alignment.

Even if the spectral energy is directed from the optical fibers to the detectors via relay optics or the like, the optical fibers 16 are advantageously held in precise alignment with the relay optics to ensure that the relay optics accurately direct the spectral energy to the appropriate detectors. Thus, one or more grooved alignment structure(s) 40, as described above, may also be used to provide a support for the optical fibers as they are aligned appropriately in relation to relay optics or the like, which then direct the spectral energy from each optical fiber to the desired detector.

FIG. 6B illustrates an embodiment in which the diameter of the optical fibers 16 is larger than the width of the detector pixel 42. As such, the optical fibers 16 may be staggered in a double row, and each detector pixel 42 may be sized to accommodate the double row of optical fibers. A portion of each detector pixel is not utilized due to the staggering of the optical fibers, and the portion not utilized therefore may be covered by a mask 44 (some of which are shown in FIG. 6B)

to minimize the amount of crosstalk between the optical fibers, for example by using a metal or other opaque film layer deposited on the detector, with openings defined by photolithographic etching processes.

In an alternative embodiment illustrated in FIG. 6C, a double row of detector pixels 42 may be utilized to accommodate the double row of optical fibers 16. The detector pixel above or below each optical fiber is therefore not utilized due to the staggering of the optical fibers, as indicated by an "X" in FIG. 6C. The unused detector pixels are not read, or the reading from the unused detector pixel may be discarded, such as by the processing element 22.

The maximum width of a single detector chip is limited, both in physical size and in number of detectors, but the total number of detectors on a single chip may be much larger than the number in a single row. For example, a typical detector chip fabrication process may be limited to chips 1 inch wide. Thus, in conventional remote sensing apparatus, if the focal plane is 10 inches wide, the detectors for a single spectral band must be distributed over at least 10 detector chips. Most types of detector chip cannot be mounted end-to-end to form a continuous row or rows of detectors; therefore the 10 detector chips may be mounted in two rows of 5, spaced far enough apart in the in-track direction to permit the detector arrays to overlap in the cross-track direction. A significant advantage of the remote sensing apparatus and method of the present invention is that a continuous row of fibers, instead of detectors, may define the focal plane, then the fibers may be divided so as to align with detectors that do not form a continuous row, i.e., detectors on multiple separate chips, as shown in FIG. 1. As such, the in-track spacing between different sections of the row in the focal plane is eliminated. Even if a single continuous row of fibers is not feasible, segments of a row of fibers can be overlapped in the cross-track direction with much less offset in the in-track direction than is required for detector chips mounted in the focal plane.

Figure 7:
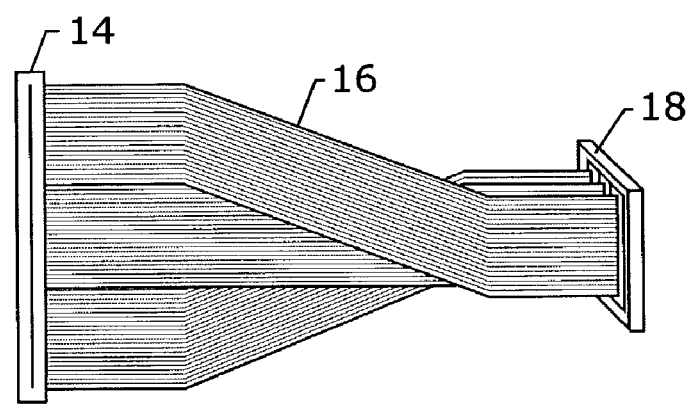
FIG. 7 illustrates a row of optical fibers along the focal plane that is broken into segments, which are aligned with multiple rows of detectors, according to one embodiment of the present invention.

In addition, although the width of individual detector chips is limited, multiple rows of detectors, or even two-dimensional arrays of detectors, may be formed on a single detector chip. The fibers forming a single row in the focal plane may therefore be arranged to align with multiple rows of detectors on a single detector chip. FIG. 7 illustrates an example of the situation described above in which a row of optical fibers 16 in the focal plane assembly 14 is broken into segments, which are aligned with multiple rows of detectors 18. This is advantageous because all of the detectors associated with a particular spectral band are located on one detector chip, which enhances the uniformity of the detectors, while also minimizing the number of detector chips required by the sensor.

The optical fibers 16 may also be aligned with a filter 46 in order to filter out any unwanted bands of spectral energy received by the optical fibers. For any given optical fiber, the filter 46 may be located proximate the end of the optical fiber located in the focal plane or proximate the detector aligned with the optical fiber. For example, if the filter is located proximate the end of the optical fiber located in the focal plane, only the desired spectral band is transmitted by the fiber to the appropriate detector. Alternatively, if the filter is located proximate the detector, then all of the spectral bands are transmitted by the fiber, and the filter 46 filters out the undesired spectral bands prior to the spectral energy reaching the appropriate detector.

FIGS. 8A–8C illustrate a few embodiments of spectral filtering that may be utilized in the remote sensing apparatus and method of the present invention. FIG. 8A illustrates one embodiment of discrete filters 46 located at an end of the optical fibers 16. Discrete filters may be located at either end of the optical fibers. One example of a discrete filter assembly is made by coating strips of transparent material, such as glass, with appropriate materials to create the desired filtering effect. The most common coating is a multilayer interference filter, although other coatings, such as colored dyes, may be used. Several such strips may be bonded together to form a block of adjacent filters for different spectral bands; this is referred to as a butcher block filter assembly. Another technique for making discrete filters involves masking a layer of transparent material, such as glass, except for a strip where a row of fibers will subsequently align with the block discrete filter, then depositing filter materials on the unmasked strip of glass. The mask is removed from the glass, and another mask is applied to the glass, covering the first filter, with a strip where another row of optical fibers will subsequently align with the block remaining exposed. Another filter may then be deposited on the exposed strip of glass. The process repeats until all of the desired filters are deposited on the glass block. Regardless of the technique used to make the discrete filter assembly, the discrete filter assembly then may be placed at one end of the optical fibers such that each row of optical fibers is aligned with one filter, as shown in FIG. 8A. An index matching fluid 48 may be utilized between the discrete filters and the ends of the optical fibers to minimize the spectral energy reflections between the discrete filters and the ends of the optical fibers.

In other embodiments of the remote sensing apparatus and method of the present invention, the filters 46 may be a coating that is deposited directly on one of the ends of the optical fibers, as shown in FIG. 8B. Prior to depositing the coating on the optical fiber end, the end of the optical fiber may be polished. In addition, the coating may be deposited on the optical fiber end prior to or subsequent to assembly of the remote sensing apparatus. When optical fibers are attached "face-on" to the detectors, however, the presence of a filter between the optical fiber end and the detector may be undesirable because the filters are generally not mechanically robust, and may be damaged by the bonding process or by later stresses applied between the fibers and the detector array.

Another type of filter 46 that may be utilized in the remote sensing apparatus and method of the present invention is a grating, such as a Bragg grating, that is formed in the optical fiber. The Bragg grating filters out all of the spectral energy except the desired portion. The grating may be utilized as the only filter, or it may be utilized to further filter any stray spectral energy in the optical fiber.

Further embodiments of the remote sensing apparatus and method align the filters 46 with the detector arrays 18. As such, discrete filters, such as the filter assemblies described above, may be attached to the appropriate detectors, as shown in FIG. 8C. Optical components, such as the lenses 50, 52, may be utilized between the ends of the optical fibers 16 and the filters 46 to ensure that the spectral energy emitted by the optical fibers 16 is incident upon the appropriate filter, and, in turn, the appropriate detector.

An advantage of the proposed invention is that in several of the embodiments described above (i.e., discrete filters proximate the detector, filters deposited on the ends of the optical fibers, or filters formed in the optical fibers) no space is required in the focal plane assembly between rows of fibers to accommodate the width of the filters. In prior focal plane assemblies, space must be provided between rows of detectors to accommodate the width of the filters. The filter width may be limited by optical considerations (i.e., the filters have a significant thickness, and are located in a converging light beam, and must be wide enough to encompass the entire light cone) or fabrication considerations (i.e., butcher block filters fabricated by Barr, Inc. and other vendors have a minimum width for each glass strip of approximately 1 mm.) For example, in a pushbroom-type remote sensing apparatus with 10 bands, if each band requires a 1 mm wide filter, a conventional remote sensing apparatus requires at least 10 mm of focal plane extent in the in-track direction, as compared to less than 1 mm for 10 rows of fibers in the remote sensing apparatus of the present invention.

Filters are also limited in maximum length by manufacturing constraints, so that for large focal planes, a conventional focal plane assembly requires that every other detector chip be offset in the in-track direction, to allow for overlapping of filters in the cross-track direction, in the same manner as described above for overlapping detector chips, even if the detector chips themselves could be butted end to end. For the remote sensing apparatus of the present invention, no such offset is required.

In addition, using the embodiment illustrated in FIG. 7, a single filter may be used proximate the detector to filter a large number of fibers aligned with multiple rows of detectors, resulting in a large decrease in the number of individual filters required by a remote sensing apparatus of the present invention.

An additional advantage of the proposed invention is that, for many of the embodiments proposed above, the orientation of the filter relative to the direction of the received energy may be controlled independently of the direction of the received energy relative to the focal plane, as illustrated in FIGS. 4 and 4A. Although the filter is not explicitly shown in FIGS. 4 and 4A, a filter may be placed on the ends of the optical fibers 16 shown in FIG. 4. This is beneficial because the wavelengths transmitted by most filters depend on the angle at which the energy is received. In conventional remote sensing apparatus designs, the dependency of the wavelength of the filter on the angle at which the energy is received results in a major additional constraint on the design of the optical system and/or the focal plane assembly, to maintain a constant orientation of the received energy relative to the filters.

As discussed above, it is convenient for many multispectral applications to split the spectral energy amongst many optical fiber ribbons with each optical fiber ribbon transmitting a respective spectral band. For hyperspectral applications, such as those involving 32 or more spectral bands, however, it is not always feasible to utilize one optical fiber ribbon for each spectral band, and therefore, the spectral bands are defined by summing the outputs of selected detectors of the two-dimensional detector arrays 18. As such, all of the spectral energy received by an optical fiber at the focal plane assembly 14 is transmitted to the detector arrays 18, which may include or be preceded by a separation element, such as a dispersive or wavelength-selective element, to separate the spectral energy into spectral bands, and to direct the spectral bands to the appropriate detector(s).

FIGS. 9, 9A and 9B illustrate one embodiment of a remote sensing apparatus 10 that includes at least one separation element 54. Thus, a group of optical fibers may be routed to a separation element 54 that separates the spectral energy emitted by each optical fiber into its respective spectral bands, then directs the energy emitted by each optical fiber to a set of detectors, such as a subset of a two-dimensional detector array. In one embodiment, each row of detectors in a two-dimensional detector array receives a particular spectral band from the group of optical fibers, with each detector in the row receiving the particular spectral band from a different optical fiber. Each column of detectors receives all of the spectral bands from one of the optical fibers, with each detector in the column receiving a different spectral band from the particular optical fiber. As such, instead of associating a single fiber with a single detector, as explained above for multi-spectral applications, a single fiber is associated with a set of detectors, such as a column of detectors in a two-dimensional detector array. Accordingly, in this embodiment, each set of detectors is dedicated to receiving the output of a respective optical fiber.

The remote sensing apparatus and method of the present invention therefore provides efficient and effective techniques for not only multispectral applications, where one optical fiber may be associated with one detector, but also for hyperspectral applications, where one optical fiber may be associated with a set of detectors by utilizing a dispersive element to direct each spectral band transmitted via the optical fiber to an appropriate detector. Thus, the focal plane is defined by the optical fibers instead of bulky detectors and dispersive elements, which allows for a focal plane with a wide field of view that is more compact than the focal plane of conventional remote sensing apparatus, such that fewer complicated corrections must be made to obtain an accurate image of the remote object.

As shown in FIGS. 9A and 9B, optical fibers 16 transmit spectral energy to the dispersive separation element 54, where the spectral bands of the spectral energy are separated. Additional optics, such as a lens, 56, may be used to direct the energy from the fibers toward the separation element. Examples of a dispersive element include but are not limited to a prism or transmission grating. In the embodiment of the remote sensing apparatus and method shown, the separation element 54 not only separates the spectral energy into spectral bands, but also focuses the spectral bands onto the appropriate set of detectors, such that additional optics are not necessary. In this embodiment, the separation element 54 may need to be larger than in alternative embodiments utilizing additional optics to focus the spectral bands onto the detectors. Although the embodiment described above with respect to FIGS. 9, 9A and 9B describes spectral separation via a dispersive separation element 54, any other technique for spectral separation known to those skilled in the art may be utilized. For instance, electrically-controlled filters that permit rapid cycling of spectral bands in time or dichroic (i.e., wavelength-sensitive) beam splitters may be used to perform the spectral separation. In addition, although the discussion above describes hyperspectral applications, the spectral separation described above may also be utilized in multispectral application, if desired.

The remote sensing apparatus can also include detector electronics 20 that are capable of summing the outputs of various individual detectors in the two-dimensional detectors, such as rows of detectors. The detector electronics 20 may be common to all of the detectors 18, and/or dedicated to respective detector arrays 18, as shown in FIGS. 1 and 9. The detector electronics 20 read the detectors, either uniformly or selectively, at a rate that is consistent with the rate at which the remote object is scanned across the focal plane assembly 14. Typical detector electronics include circuitry to generate one or more clock signals, a shift register or multiplexer which allows many detectors to be sampled in sequence, one at a time, an output amplifier, and an analog to digital (A to D) converter which coverts the signal received by each detector into a digital number (DN) for storage or further digital processing. In the case of CCD detectors, the shift register function is inherent in the detector array itself, i.e., the detector elements may also serve as elements of a shift register during readout. In the embodiment illustrated in FIG. 9, the summing of adjacent rows of a two-dimensional detector to define spectral bands may be performed either in the analog domain, by summing appropriate detector signals prior to A to D conversion, or in the digital domain by adding together appropriate DNs. Various specific implementations are known to those skilled in the art.

In addition to any other processing function, including the functions described hereinabove, the processing element 22 is capable of receiving and combining the data from the detectors into images of the remote object. The processing element 22 may be integral with the other components of the remote sensing apparatus 10, as shown in FIGS. 1 and 9. In other embodiments of the remote sensing apparatus, however, the processing element 22 may be separate from the other parts of the remote sensing apparatus, but in communication with at least the detector electronics 20.

Therefore, the remote sensing apparatus and method of the present invention provide for separation of the detector arrays 18 from the focal plane assembly 14, which is advantageous over conventional remote sensing apparatus in which the detector arrays are included in the focal plane assembly, because the in-track extent of the focal plane can be minimized, while the separate detector arrays can be designed for optimum thermal and electrical properties. In particular, the focal plane extent, which is defined by the optical fibers, is compact in the in-track direction, while also providing a wide cross-track field of view, such that the spectral energy received by the focal plane can be transformed into images of the remote object without the need for complicated corrections. As such, not only is the focal plane assembly a more efficient, cost effective, and simpler design, the detector electronics and processing element utilized to receive, interpret and present the data received via the focal plane also may be less complicated, and therefore, less expensive than the detector electronics and processing element required in conventional remote sensing apparatus. In addition, the focal plane may be designed in any appropriate manner for the particular application of the remote sensing apparatus, such as a curved focal plane and/or non-uniform spacing of the optical fibers defining the focal plane. The remote sensing apparatus and method of the present invention therefore provides improved registration between and within spectral bands because the more compact focal plane extent in the in-track direction allows the registration to be less sensitive to the height of the remote object than larger focal planes in the in-track direction that view the remote object from slightly different angles.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A remote sensing apparatus, comprising:
    a plurality of optical fibers, wherein one end of said optical fibers is located in a focal plane of an optical system, with the end of each optical fiber collecting spectral energy arriving at a particular location in the focal plane, wherein the ends of the optical fibers that are located in the focal plane are arranged in a row; and
    a plurality of detectors, wherein each detector is coupled to the other end of a single optical fiber of said plurality of optical fibers to measure an intensity of the spectral energy emitted by the optical fiber, wherein said plurality of detectors are arranged in a plurality of rows such that said plurality of optical fibers transition from a first end with the ends of the optical fibers arranged in a row to a second end with the other ends of the optical fibers arranged in a greater number of rows and coupled to said plurality of detectors.

2. The remote sensing apparatus according to claim 1, further comprising at least one alignment element for aligning said plurality of optical fibers with said plurality of detectors to couple a single optical fiber to each detector.

3. The remote sensing apparatus according to claim 2, wherein said at least one alignment element defines a plurality of grooves.

4. The remote sensing apparatus according to claim 2, wherein said at least one alignment element comprises a faceplate fixed to said plurality of detectors, wherein the faceplate defines a plurality of openings that are aligned with said plurality of detectors to couple a respective optical fiber to each detector.

5. The remote sensing apparatus according to claim 1, wherein the focal plane is curved.

6. The remote sensing apparatus according to claim 1, further comprising a focal plane assembly for securing the ends of said plurality of optical fibers in a uniform distribution.

7. The remote sensing apparatus according to claim 6, wherein the ends of said plurality of optical fibers are secured in said focal plane assembly at a predetermined angle relative to said focal plane.

8. The remote sensing apparatus according to claim 1, wherein the end of each optical fiber collects spectral energy arriving at a respective picture element of a plurality of picture elements located in the focal plane.

9. The remote sensing apparatus according to claim 8, wherein each optical fiber of said plurality of optical fibers has a diameter that is smaller than the respective picture element of the plurality of picture elements.

10. The remote sensing apparatus according to claim 8, wherein each optical fiber of said plurality of optical fibers has a diameter that is equal to a size of the respective picture element of the plurality of picture elements.

11. The remote sensing apparatus according to claim 8, wherein each optical fiber of said plurality of optical fibers has a diameter that is larger than the respective picture element of the plurality of picture elements.

12. The remote sensing apparatus according to claim 1, wherein said plurality of optical fibers comprises a plurality of layers of optical fibers.

13. The remote sensing apparatus according to claim 1, wherein the other end of each of said plurality of optical fibers is attached to one of said plurality of detectors.

14. The remote sensing apparatus according to claim 1, wherein the other end of each of said plurality of optical fibers is aligned with a mirror that reflects the spectral energy from the optical fiber and directs the spectral energy to one of said plurality of detectors.

15. The remote sensing apparatus according to claim 1, wherein the other end of each of said plurality optical fibers is aligned with a lens that directs the spectral energy from the optical fiber to one of said plurality of detectors.

16. The remote sensing apparatus according to claim 1, further comprising at least one filter, wherein at least one of said plurality of optical fibers is aligned with said at least one filter.

17. The remote sensing apparatus according to claim 16, wherein said at least one filter is deposited on one end of at least one of said plurality of optical fibers.

18. The remote sensing apparatus according to claim 16, wherein said at least one filter is located proximate said focal plane defined by one end of said plurality of optical fibers.

19. The remote sensing apparatus according to claim 16, wherein said at least one filter is located proximate said plurality of detectors.

20. The remote sensing apparatus according to claim 1, wherein at least one of said plurality of optical fibers comprises a grating to filter a predefined bandwidth of spectral energy from the optical fiber.

21. The remote sensing apparatus according to claim 1, wherein said plurality of optical fibers comprises at least one optical fiber ribbon.

22. The remote sensing apparatus according to claim 1, further comprising a processing element in communication with said plurality of detectors, wherein said processing element receives spectral energy intensity measurements from said plurality of detectors and displays a representation of the measurements as at least one image.

23. The remote sensing apparatus according to claim 1, wherein said plurality of detectors comprises a plurality of sets of detectors, and further comprising at least one separation element for separating the spectral energy from each of said plurality of optical fibers into a plurality of spectral bands, and wherein each set of detectors is dedicated to the plurality of spectral bands emitted by one of said plurality of optical fibers.

24. A remote sensing apparatus, comprising:
  a plurality of optical fibers, wherein one end of said optical fibers is located in a focal plane of an optical system, with the end of each optical fiber collecting spectral energy arriving at a particular location in the focal plane, wherein the ends of the optical fibers that are located in the focal plane are arranged in a row;
  at least one separation element, wherein said at least one separation element separates the spectral energy emitted by each optical fiber into a plurality of spectral bands; and
  a plurality of sets of detectors, wherein each set of detectors is optically coupled to a respective optical fiber of said plurality of optical fibers, and wherein each detector in each set of detectors receives a respective spectral band emitted by a respective optical fiber, wherein at least one set includes a plurality of detectors that are arranged in a plurality of rows such that said plurality of optical fibers transition from a first end with the ends of the optical fibers arranged in a row to a second end with the other ends of the optical fibers arranged in a greater number of rows and coupled to said plurality of detectors of the at least one set.

25. The remote sensing apparatus according to claim 24, wherein said at least one separation element is a dichroic element.

26. The remote sensing apparatus according to claim 24, wherein said at least one separation element is a dispersive element.

27. The remote sensing apparatus according to claim 26, wherein said at least one dispersive element is at least one prism.

28. The remote sensing apparatus according to claim 26, wherein said at least one dispersive element is at least one grating.

29. The remote sensing apparatus according to claim 24, further comprising at least one alignment element for aligning said plurality of optical fibers with said plurality of sets of detectors via said at least one separation element.

30. The remote sensing apparatus according to claim 29, wherein said at least one alignment element defines a plurality of grooves.

31. The remote sensing apparatus according to claim 24, further comprising a focal plane assembly for securing the ends of said plurality of optical fibers in a uniform distribution.

32. The remote sensing apparatus according to claim 31, wherein the ends of said plurality of optical fibers are secured in said focal plane assembly at a predetermined angle relative to said focal plane.

33. The remote sensing apparatus according to claim 24, wherein said focal plane is curved.

34. The remote sensing apparatus according to claim 24, wherein the end of each optical fiber collects spectral energy arriving at a respective picture element of a plurality of picture elements located in the focal plane.

35. The remote sensing apparatus according to claim 34, wherein each optical fiber of said plurality of optical fibers has a diameter that is smaller than the respective picture element of the plurality of picture elements.

36. The remote sensing apparatus according to claim 34, wherein each optical fiber of said plurality of optical fibers has a diameter that is equal to a size of the respective picture element of the plurality of picture elements.

37. The remote sensing apparatus according to claim 34, wherein each optical fiber of said plurality of optical fibers has a diameter that is larger than the respective picture element of the plurality of picture elements.

38. The remote sensing apparatus according to claim 24, wherein said plurality of optical fibers comprises at least one optical fiber ribbon.

39. The remote sensing apparatus according to claim 24, further comprising a processing element in communication with said plurality of sets of detectors, wherein said processing element receives spectral energy intensity measurements from said plurality of sets of detectors and displays a representation of the measurements as at least one image.

40. A method for detecting spectral energy comprising:
  receiving spectral energy from a remote location with the first ends of a plurality of optical fibers disposed in a row in a focal plane;
  transmitting the spectral energy by the plurality of optical fibers to a plurality of detectors arranged in a plurality of rows proximate opposed second ends of the optical fibers, wherein transmitting the spectral energy comprises transitioning the plurality of optical fibers from the first ends that are arranged in a row to the second ends that are arranged in a greater number of rows;
  dedicating a single detector to each optical fiber; and
  detecting the spectral energy transmitted via the plurality of optical fibers by the plurality of detectors with each detector detecting the spectral energy emitted by a respective optical fiber.

41. The method for detecting spectral energy according to claim 40, further comprising aligning the plurality of optical fibers with the plurality of detectors to couple one optical fiber to each detector prior to transmitting the spectral energy.

42. The method for detecting spectral energy according to claim 40, further comprising aligning an end of an optical fiber with a mirror that reflects the spectral energy emitted by the optical fiber and directs the spectral energy to a dedicated detector, prior to transmitting the spectral energy.

43. The method for detecting spectral energy according to claim 40, further comprising aligning an end of an optical fiber with a lens that directs the spectral energy from the optical fiber to a dedicated detector, prior to transmitting the spectral energy.

44. The method for detecting spectral energy according to claim 40, further comprising filtering a predefined bandwidth of spectral energy from the spectral energy transmitted by an optical fiber, prior to detecting the spectral energy.

45. The method for detecting spectral energy according to claim 40, further comprising measuring an intensity of the detected spectral energy.

46. The method for detecting spectral energy according to claim 45, further comprising displaying a representation of the measurements of the intensity of the detected spectral energy as at least one image.

47. The method for detecting spectral energy according to claim 40, further comprising determining an association between a location on the focal plane and a respective detector by successively illuminating each location on the focal plane and measuring the respective detector response.

48. The method for detecting spectral energy according to claim 47, further comprising:
   identifying at least one of a faulty detector and faulty optical fiber when the respective detector does not respond after illuminating a location on the focal plane; and
   replacing the at least one of the faulty detector and faulty optical fiber with at least one of a spare detector and optical fiber, respectively.

* * * * *